UNITED STATES PATENT OFFICE.

JAMES A. HENRY, OF PLATTEVILLE, WISCONSIN.

SOLVENT FOR PAINTS, OILS, AND VARNISHES.

SPECIFICATION forming part of Letters Patent No. 275,381, dated April 10, 1883.

Application filed January 27, 1883. (No specimens.)

*To all whom it may concern:*

Be it known that I, JAMES A. HENRY, a resident of Platteville, Grant county, Wisconsin, have invented and discovered a certain new and useful Composition of Matter for the Purpose of a Solvent for Paints, Oils, and Varnishes; and I do hereby declare that the following is a true, full, clear, and exact description of the invention, which will enable others skilled in the arts to which it appertains to make, compound, and use the same.

My invention relates to a composition to be applied with a brush or other suitable tool or appliance to paints, oils, or varnishes upon surfaces of wood, glass, iron, or other materials and substances for the purpose of solving and removing the same fully and completely, so that said wood, glass, iron, or other materials or substances may be again repainted, oiled, or varnished as readily, fully, and perfectly as if they had not theretofore been painted, oiled, or varnished, and without injury to the surface, grain, or texture of the wood, glass, iron, or other substances or materials operated upon.

My invention also relates to a solvent for paint, oil, or varnish which will not burn, corrode, or injure brushes used in applying it, or injure, burn, or corrode the clothing or persons of the workmen in using and applying it.

I am aware that concentrated lye, caustic soda, and other substances have been used, either alone or in combination with other substances, to solve and remove paint, oil, or varnish from wood, glass, iron, and other substances or materials; but they are difficult of application, do not leave the wood, iron, or other materials operated upon in a proper and satisfactory condition for repainting, oiling, or varnishing, as the case may be, and in some cases they dry up too rapidly, and they burn, corrode, or destroy very rapidly the brushes, tools, or appliances necessarily used in applying them, and also injure and destroy the clothing of the workman using the same, if by accident any of the preparation gets thereon, and also will injure and burn the hands and person of the workman, if any, by accident or necessarily, gets, falls, or runs upon them; and a composition which would remove in a proper, speedy, and satisfactory manner paints, oils, or varnishes, and leave the surface of the wood, iron, or other substances or materials so that it could be readily and properly repainted, oiled, or varnished, and capable of being applied thoroughly and evenly upon painted, oiled, or varnished surfaces, at any angle or position they might be, with a brush or other suitable appliance, and at the same time not burn or injure the brush or other appliance, or burn or injure the person or clothing of the workman using the same, has been long and earnestly sought for by painters and others interested in the art.

My invention and discovery meets that want, and not only acts as a perfect solvent of the paint or varnish, leaving the wood, iron, or other substance or material in proper order and condition to receive and retain the new paint, oil, or varnish, but also is readily and properly applied with any ordinary painter's brush upon surfaces at any angle or plane, and will not injure the brush or other appliance used to apply it, or the hands, person, or clothing of the workman using it, and will not dry up too rapidly.

My invention consists of caustic soda or alkali, water, molasses, or analogous substance, and starch mixed in different combinations, depending upon the degree of strength and quality desired. For the alkali I use the caustic soda of commerce; but other kinds may be used. The mode of preparing my composition to give the best results for general use is as follows and in the following proportions: Take one part caustic soda of commerce (or other alkali of equal strength) and seven (7) parts water and boil the same together. Then to every gallon of compound add, while boiling, one-half pint of molasses, or equivalent and analogous substance or material, and six ounces starch. When thoroughly dissolved and mixed, cool, and it is ready for use. From the nature of the case I do not limit myself to any specific proportion of caustic soda, water, molasses, or starch. When using apply with ordinary painter's brush or other suitable tool or appliance, and allow it to remain on place ten to thirty minutes, (according to work;) then wash off with wet sponge, cloth, or other suitable means.

I claim—

The combination of caustic soda with water, molasses, (or other analogous ingredient,) and starch, substantially and for the purposes set forth.

JAMES ANDREWS HENRY.

In presence of—
 WILLIAM E. BELL,
 CHRISTOPHER BELL.